(12) United States Patent
Snowberger (10) Patent No.: US 7,444,778 B2
(45) Date of Patent: Nov. 4, 2008

(54) FISHING DIVER

(76) Inventor: Cindy L. Snowberger, 395 Roosevelt Terrace Rd., St. Augustine, FL (US) 32084

( * ) Notice: Subject to any disclaimer, the term of this patent is extended or adjusted under 35 U.S.C. 154(b) by 0 days.

(21) Appl. No.: 11/434,456

(22) Filed: May 15, 2006

(65) Prior Publication Data

US 2007/0261290 A1 Nov. 15, 2007

(51) Int. Cl.
*A01K 91/08* (2006.01)
(52) U.S. Cl. ..................................... 43/43.13
(58) Field of Classification Search ............... 43/43.13, 43/42.23, 42.22
See application file for complete search history.

(56) References Cited

U.S. PATENT DOCUMENTS

| | | | | | |
|---|---|---|---|---|---|
| 1,749,464 | A | * | 3/1930 | Bond | 43/43.13 |
| 2,220,302 | A | * | 11/1940 | Thorne | 43/43.13 |
| 2,235,868 | A | * | 3/1941 | Coolidge et al. | 43/43.13 |
| 2,247,583 | A | * | 7/1941 | Louthan | 43/43.13 |
| 2,273,209 | A | * | 2/1942 | Louthan | 43/43.13 |
| 2,520,562 | A | * | 8/1950 | Peeler | 43/43.13 |
| 2,566,029 | A | * | 8/1951 | Louthan | 43/43.13 |
| 2,716,832 | A | * | 9/1955 | Minnie, III | 43/43.13 |
| 2,731,755 | A | * | 1/1956 | Ward et al. | 43/43.13 |
| 3,135,065 | A | * | 6/1964 | Cromoga | 43/43.13 |
| 3,140,555 | A | * | 7/1964 | Gross | 43/43.13 |
| 3,466,787 | A | * | 9/1969 | Collins | 43/43.13 |
| 3,543,431 | A | * | 12/1970 | Olds | 43/43.13 |
| 3,570,167 | A | * | 3/1971 | Smith | 43/43.13 |
| 3,583,089 | A | * | 6/1971 | Scarbro | 43/43.13 |
| 3,613,290 | A | * | 10/1971 | Louthan | 43/43.13 |
| 3,643,370 | A | * | 2/1972 | Cook et al. | 43/43.13 |
| 3,667,148 | A | * | 6/1972 | Dawson | 43/43.13 |
| 3,708,904 | A | * | 1/1973 | Zaharis | 43/43.13 |
| 3,755,955 | A | * | 9/1973 | Saia | 43/43.13 |
| 3,808,727 | A | * | 5/1974 | Flanders | 43/43.13 |
| 3,835,573 | A | * | 9/1974 | Borchardt | 43/43.13 |
| 3,844,059 | A | * | 10/1974 | Weber | 43/43.13 |
| 3,863,382 | A | * | 2/1975 | Heili | 43/43.13 |
| 3,897,648 | A | * | 8/1975 | Neary | 43/43.13 |
| 3,898,759 | A | * | 8/1975 | Jensen | 43/43.13 |
| 3,949,512 | A | * | 4/1976 | Stegemeyer | 43/43.13 |
| 3,971,154 | A | * | 7/1976 | Craig | 43/43.13 |
| 4,128,959 | A | * | 12/1978 | Staaden | 43/43.13 |
| 4,129,956 | A | * | 12/1978 | Neary | 43/43.13 |
| 4,199,891 | A | * | 4/1980 | Davis | 43/43.13 |

(Continued)

FOREIGN PATENT DOCUMENTS

JP 09056312 A * 3/1997

*Primary Examiner*—Darren W Ark
(74) *Attorney, Agent, or Firm*—Dale J. Ream (57) ABSTRACT

A deep sea fishing diver according to the present invention includes a body having front and rear ends, opposed top and bottom surfaces, and opposed sides that extend away from the top surface. The body includes a configuration that defines a center of gravity that is coincident with a center of effort. The diver includes a balance bar having forward and rearward portions extending upward from the top surface with a connecting portion. The balance bar is configured such that a fishing line attached thereto is movable between ready and tripped configurations. Gravity and current forces acting on the center of effort are collinear with a force between the fishing line and balance bar. This construction enables the diver to descend and maintain its position without weights, avoids erroneous tripping, and reduces cost.

11 Claims, 6 Drawing Sheets

U.S. PATENT DOCUMENTS

| | | | |
|---|---|---|---|
| 4,255,890 A * | 3/1981 | Smith | 43/43.13 |
| 4,282,672 A * | 8/1981 | Neary | 43/43.13 |
| 4,411,090 A * | 10/1983 | Seals | 43/43.13 |
| 4,876,820 A * | 10/1989 | Vann | 43/43.13 |
| 4,922,648 A * | 5/1990 | Louthan | 43/43.13 |
| 4,951,413 A * | 8/1990 | Blevins et al. | 43/43.13 |
| 5,020,268 A * | 6/1991 | Combs, III | 43/43.13 |
| 5,193,300 A * | 3/1993 | Johnson | 43/43.13 |
| 5,375,366 A * | 12/1994 | Johnson | 43/43.13 |
| 5,956,889 A * | 9/1999 | West | 43/43.13 |
| 6,018,903 A * | 2/2000 | Miralles | 43/43.13 |
| 6,655,074 B2 * | 12/2003 | Pentland | 43/43.13 |
| 6,658,784 B1 * | 12/2003 | Mastropaolo | 43/43.13 |
| 2006/0168874 A1 * | 8/2006 | Hull | 43/43.13 |

* cited by examiner

FISHING DIVER

BACKGROUND OF THE INVENTION

The present invention relates generally to fishing tackle and, more particularly, to a fishing diver for maintaining a depth beneath an ocean surface without the use of weights and without requiring continuous trolling movement of a boat.

Ocean fisherman often desire to fish very near the ocean floor. It is difficult, however, to position and maintain the bait and hook rigging in this position due to strong water currents. Obviously, these problems make it very difficult to catch certain types of fish.

Various products, proposals, and methods have been utilized in the past for accomplishing this objective. Specifically, deep sear diver or planer devices have included heavy weights to urge the diver to the ocean bottom. Once at the bottom, however, this position has been difficult to maintain without the boat maintaining a continuous trolling motion. Another method requires the use of at least two fishing lines that are complicated for the average fisherman. Although these methods and devices are assumably effective for their intended purposes, the weights, boat movement, or complex rigging are very inconvenient and expensive.

Therefore, it would be desirable to have an improved deep sea diver that would descend to the ocean bottom and maintain that position without the use of ballast weights and without requiring that the boat continuously troll on the ocean surface.

SUMMARY OF THE INVENTION

Accordingly, a deep sea diver according to the present invention includes a body having front and rear ends, opposed sides, and opposed top and bottom surfaces. A balance bar extends upwardly from the top surface of the body member, includes forward and rearward portions, and is positioned along an imaginary axis extending between front and rear ends of the body. This axis divides the body into symmetrical halves.

The unique configuration of the body is such that it defines a center of gravity and center of effort that are coincident. The configuration also defines a structure in which a composite force acting upon the center of effort is collinear with a tension force between a fishing line and the balance bar when the fishing line is at a ready configuration. These structure and configuration keep the fishing diver in equilibrium at all orientations in the water as will be described in detail below.

Therefore, a general object of this invention is to provide a deep sea diver that descends toward an ocean floor and maintains its position for fishing near the ocean floor.

Another object of this invention is to provide a deep sea diver, as aforesaid, that cooperates with ocean currents to automatically descend toward the ocean floor without the use of ballast weights.

Still another object of this invention is to provide a deep sea diver, as aforesaid, that automatically ascends to the ocean surface after catching a fish.

Yet another object of this invention is to provide a deep sea diver, as aforesaid, having a configuration that is in equilibrium such that lines of action for current and gravity forces intersect at the same point.

A further object of this invention is to provide a deep sea diver, as aforesaid, that avoids being erroneously tripped.

A still further object of this invention is to provide a deep sea diver, as aforesaid, that is inexpensive to manufacture and is easy to use.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 1b is a top view of the fishing diver as in FIG. 1a;

FIG. 1c is a side view of the fishing diver as in FIG. 1a;

FIG. 2b is a top view of the fishing diver as in FIG. 2a;

FIG. 2c is a side view of the fishing diver as in FIG. 2a;

DESCRIPTION OF THE PREFERRED EMBODIMENT

A fishing diver 100 according to the present invention will now be described in detail with reference to FIGS. 1 through 6b of the accompanying drawings. More particularly, a fishing diver 100 according to the current invention includes a body 110 and a balance bar 120.

Figures 5A, 5B:
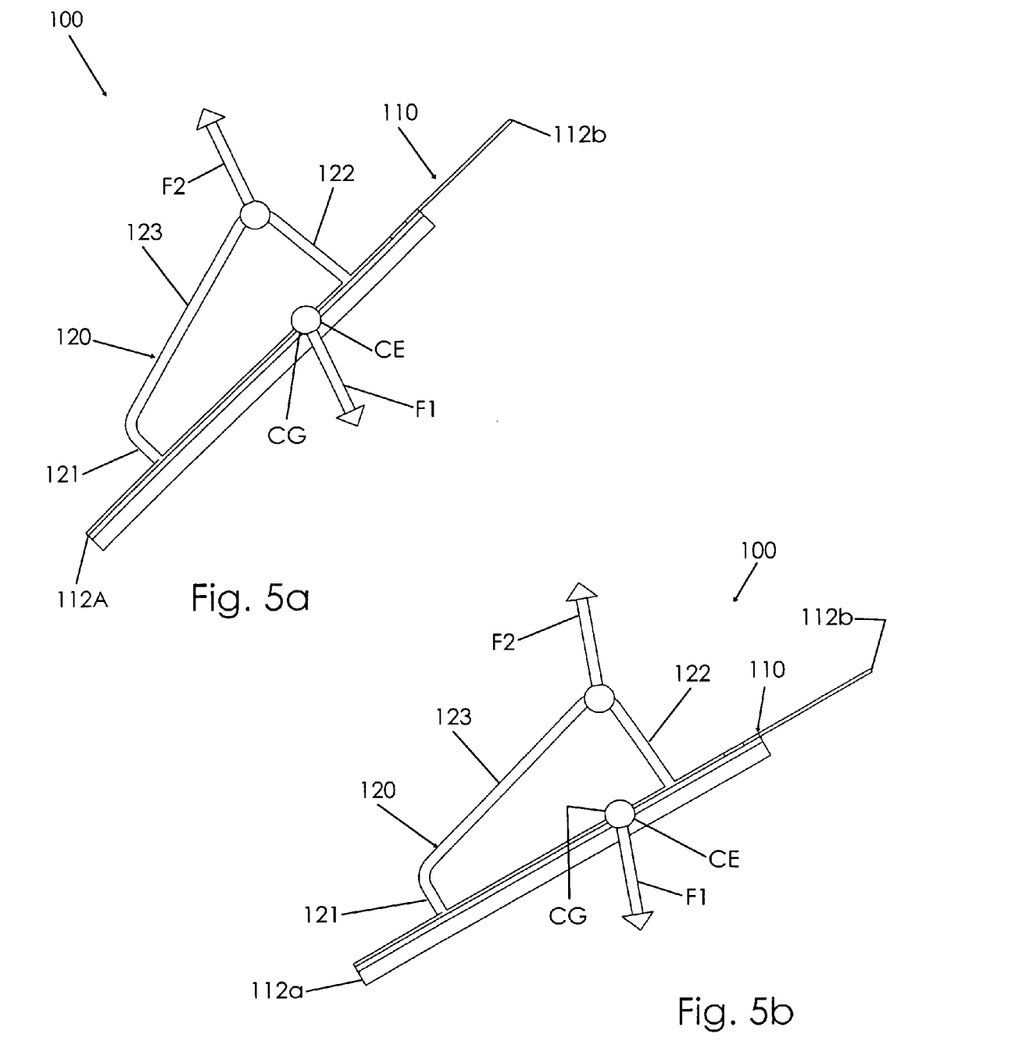
FIG. 5a is another side view of the fishing diver as in FIG. 2a in one orientation illustrating collinear forces and coincident centers of gravity and effort.
FIG. 5b is another side view as in FIG. 5a in another orientation but further illustrating the collinear forces and coincident centers of gravity and effort and FIGS. 6a and 6b are side views of a fishing diver according to the prior art shown at different orientations to illustrate that the lines of action and centers of gravity and effort are not in equilibrium.

The body 110 has front and rear ends 112a, 112b, opposed sides 112c, 112d, and opposed top and bottom surfaces 113a, 113b. The front and rear ends 112a, 112b may be of substantially the same width (FIGS. 1a and 1b), or the rear end 112b may be wider than the front end 112a (FIGS. 2a and 2b). The body 110 also has a center of gravity CG that is coincident with a center of effort CE, as shown in FIGS. 5a and 5b. The center of gravity CG is the point at which the sum of the moments of the areas about the point equals zero. More simply, the center of gravity CG is the point at which the body's mass can be assumed, for most purposes, to be concentrated. The center of effort CE is the point at which a sum of the forces of the water currents may act upon the body 110 and have the same effect as the forces of the water currents actually spread along the body 110. In other words, the center of effort CE is the point at which the forces of the water currents can be assumed to be concentrated on the body 110.

Figure 1A:
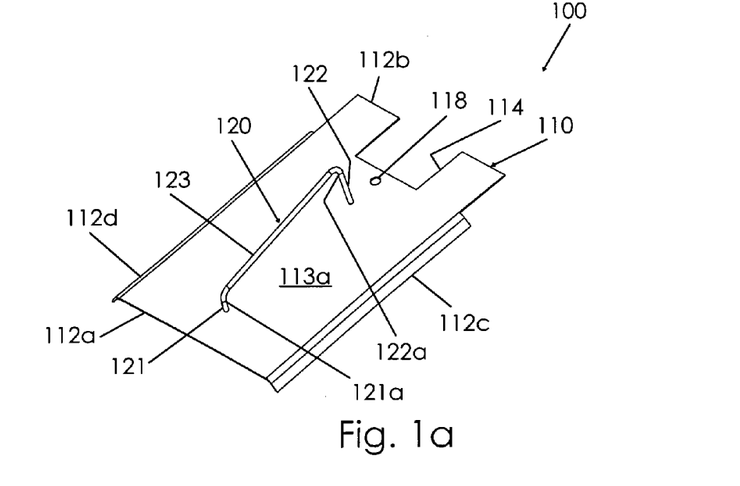
FIG. 1a is a perspective view of a fishing diver according to one embodiment of the present invention.
Figure 1B:
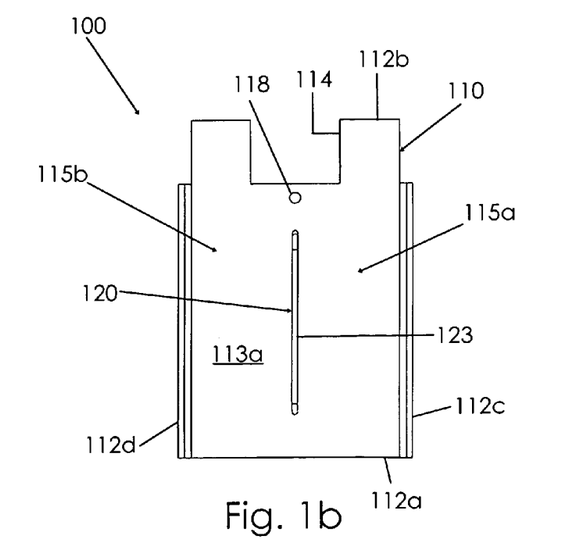
Figure 2A:
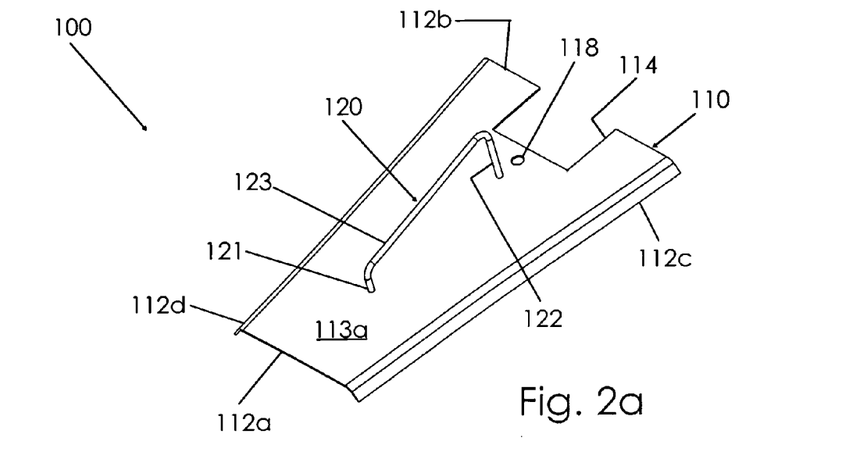
FIG. 2a is a perspective view of a fishing diver according to another embodiment of the present invention.
Figure 2B:
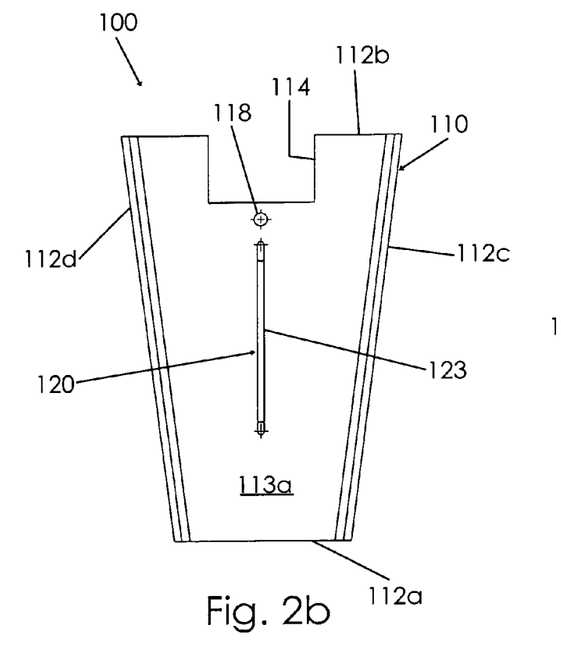
Figure 2C:
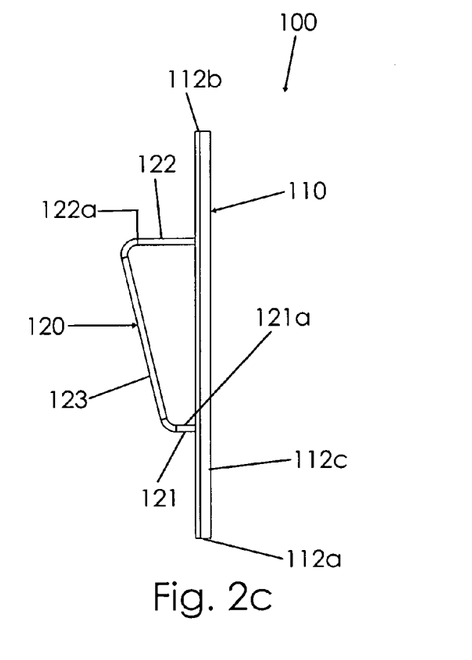

An imaginary axis (not shown) extends from the front end 112a of the body 110 to the rear end 112b of the body 110 and separates symmetrical first and second halves 115a, 115b of the body 110 (FIG. 1b). The body 110 may define a void 114 adjacent the rear end 112b as shown throughout the drawings, and the void 114 may be centered along and/or symmetrical about the imaginary axis. The opposed sides 112c, 112d of the body 110 may extend away from the top surface 113a of the body 110 (FIGS. 1a, 2a, 3, and 4). More particularly, the sides 112c, 112d may extend along the entire length of the body 110

Figure 1C:
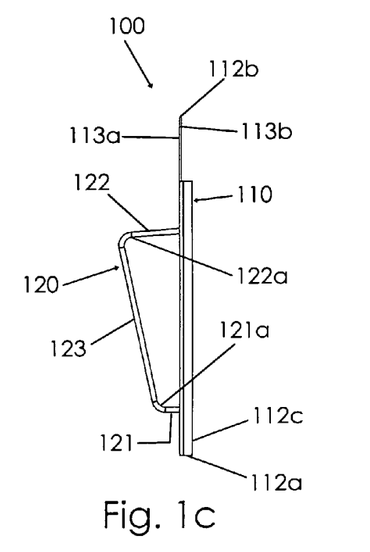

(FIGS. 2a through 2c), or the sides 112c, 112d may extend along part of the length of the body 110 (FIGS. 1c through 1c).

The balance bar 120 extends upwardly from the top surface 113a and has forward and rearward portions 121, 122 extending generally perpendicular to the top surface 113. A connecting portion 123 connects a top end 121a of the forward portion 121 to a top end 122a of the rearward portion 122. As shown throughout the drawings, the rearward portion 122 may be longer than the forward portion 121. The forward and rearward portions 121, 122 of the balance bar 120 may be centered along the imaginary axis.

Figure 3:
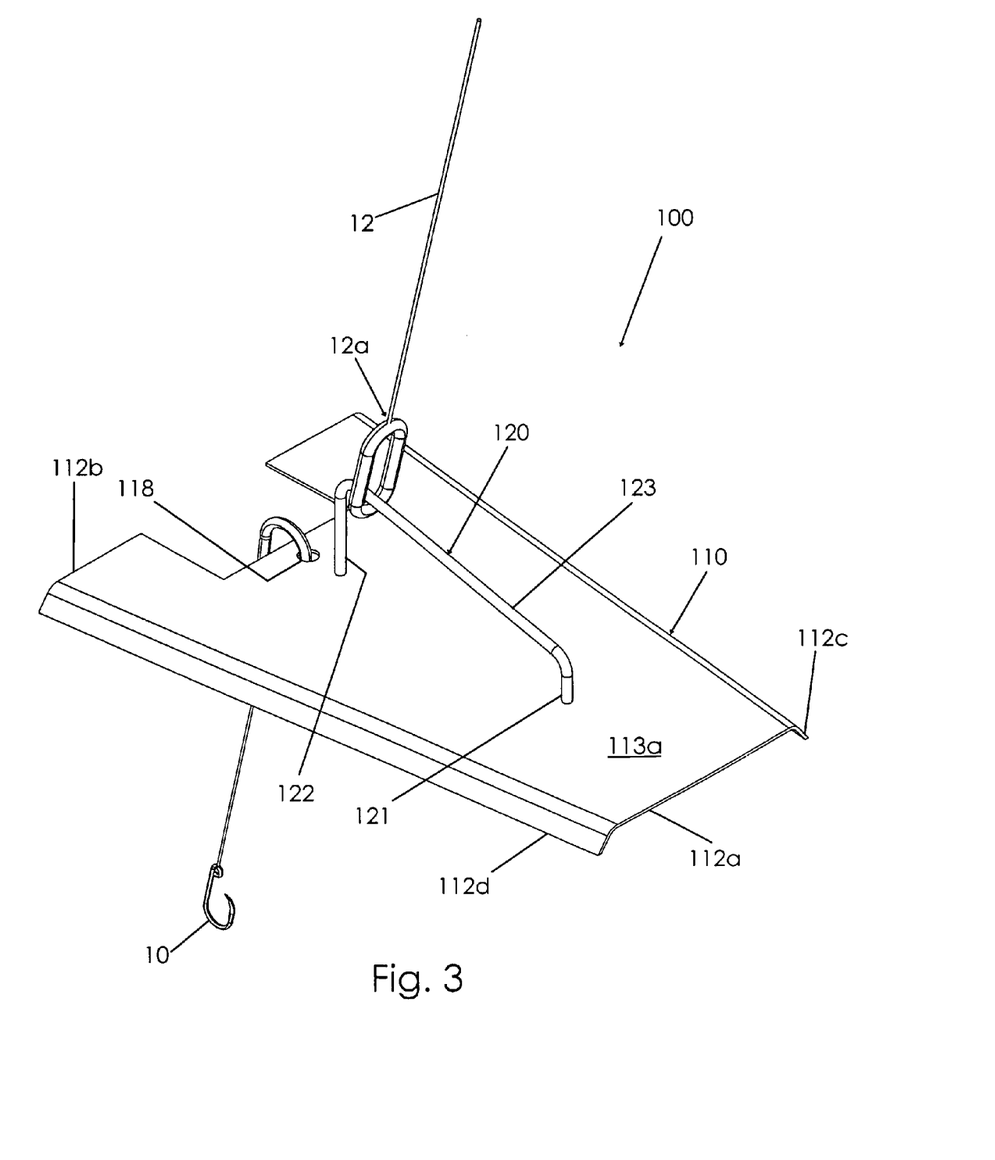
FIG. 3 is another perspective view of the fishing diver as in FIG. 2a shown in a ready configuration.

Means for operatively attaching a hook 10 (e.g., a circle hook) to the body 110 are preferably included. More particularly, the body 110 may define a hole 118 adjacent the rear end 112b. As shown in FIG. 3, the hole 118 may be between the balance bar rearward portion 122 and the rear end 112b of the body 110. The hole 118 may be centered along and/or symmetrical about the imaginary axis.

Figure 4:
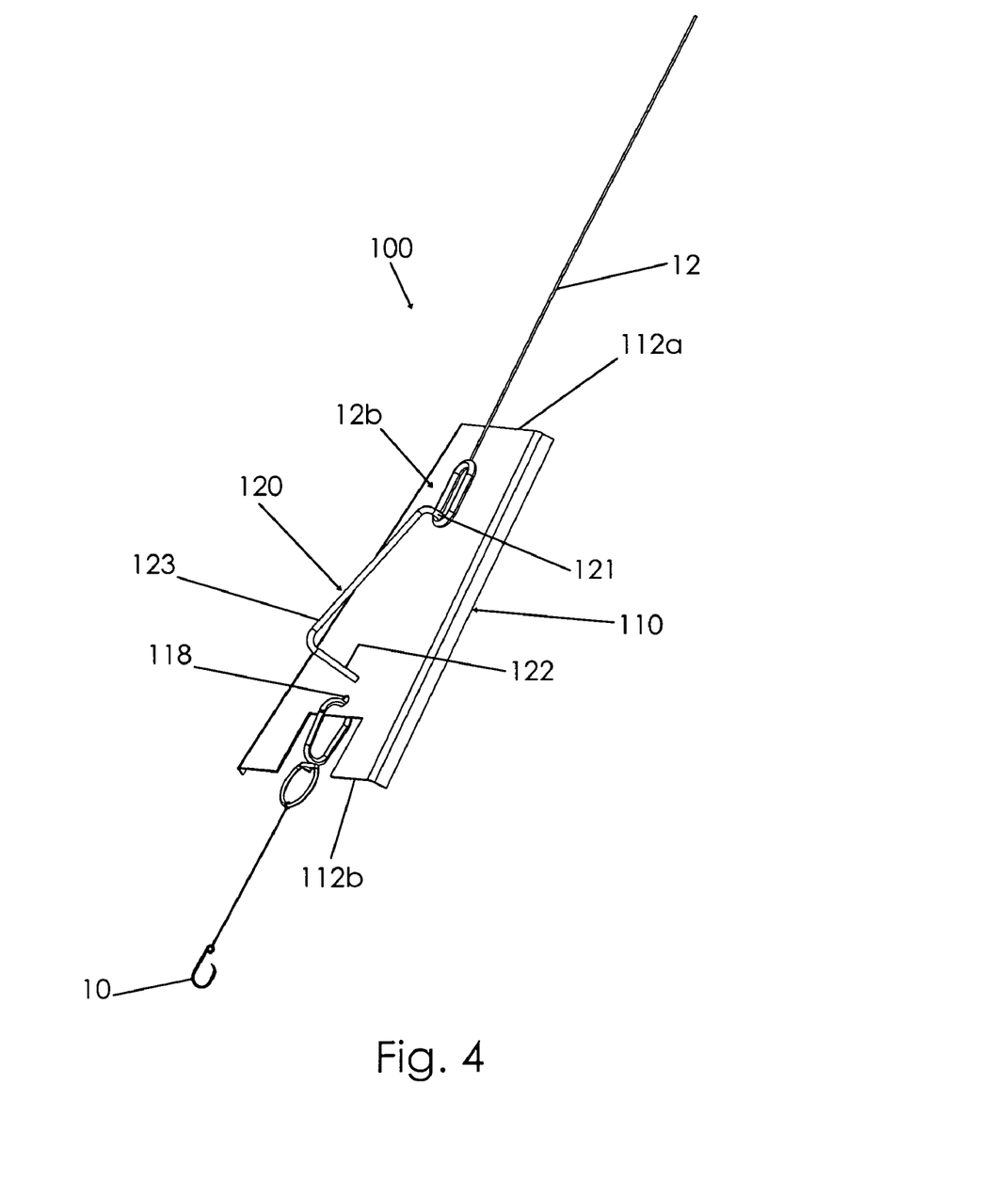
FIG. 4 is another perspective view of the fishing diver as in FIG. 2a shown in a tripped configuration.

In use, the fishing diver 100 may remain near a sea floor without the use of ballast weights and without requiring movement of the user. The hook 10 may be operatively coupled to the body 110 using the hole 118, and a fishing line 12 may be operatively coupled to the balance bar 120 (FIGS. 3 and 4). The fishing line 12 may be adjustable between a ready configuration 12a (FIG. 3) and a tripped configuration 12b (FIG. 4). As shown in FIG. 3, the fishing line 12 may be adjacent an intersection of the rearward and connecting portions 122, 123 of the balance bar 120 when at the ready configuration 12a; and as shown in FIG. 4, the fishing line 12 may be adjacent the balance bar forward portion 121 when at the tripped configuration 12b. As shown in FIGS. 5a and 5b, a composite force F1 (which includes current and gravity forces) acting upon the center of effort CE and the center of gravity CG may be colinear with a tension force F2 between the fishing line and the balance bar 120 when the fishing line 12 is at the ready configuration 12a. This biases the fishing line 12 toward the ready configuration 12a and helps prevent the fishing line 12 from moving to the tripped configuration 12b until the hook 10 is pulled. When the hook 10 is pulled (i.e., by a fish), the fishing line 12 is moved to the tripped configuration 12b and the user may bring the fishing diver 100, the hook 10, and the fish on the hook 10 to the surface. If current forces are not present, however, the fishing line 12 may move to the tripped configuration 12b before the hook 10 is pulled.

Figures 6A, 6B:
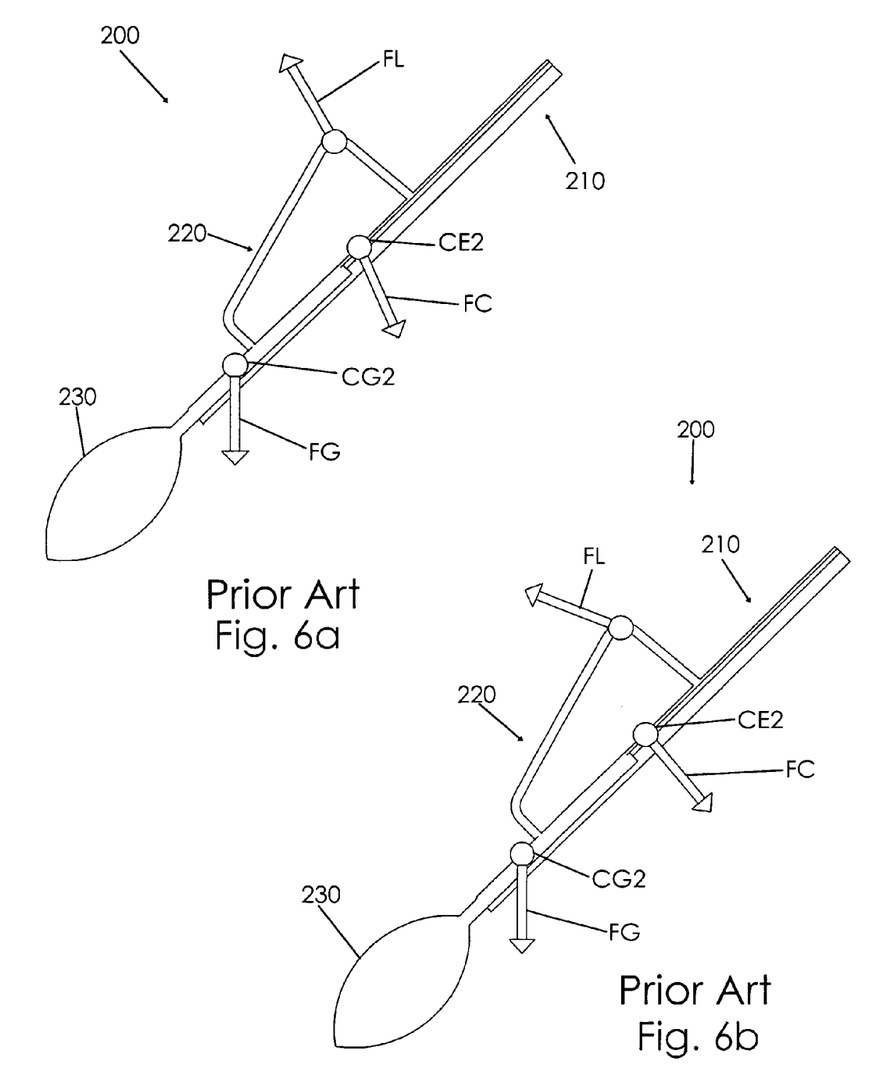

FIGS. 6a and 6b show a prior art fishing diver 200 that includes a body 210, a balance bar 220, and a ballast weight 230. The ballast weight 230 is not coupled to the body 110 of the fishing diver 100 described above. The ballast weight 230 is necessary in the prior art diver 200, however, to aid the diver 200 in reaching the sea floor and to keep the fishing line 12 from moving to the tripped configuration 12b (as shown above in FIG. 4) because the diver's center of gravity CG2 is not coincident with its center of effort CE2. Even with the ballast weight 230, though, the fishing line 12 is more likely to move to the tripped configuration 12b unnecessarily in the prior art diver 200 than in the fishing diver 100 described above. This can be understood by studying the forces acting on the diver 200.

For the diver 200 to be in equilibrium, the lines of action for the forces (current and gravity forces FC, FG and the force FL between the fishing line and the balance bar 220) must intersect at a single point. The lines of action are lines going through the points of application and along the directions of action of the forces. Because the center of gravity CG2 is not coincident with the center of effort CE2, this intersection point can vary greatly, often leading the fishing line 12 to move to the tripped configuration 12b. This problem does not occur in the fishing diver 100, as the center of gravity CG and the center of effort CE are coincident in the fishing diver 100.

Further, the ballast weight 230 must be reeled in with the hook 10 when a fish is caught, or the ballast weight 230 must be attached to the body 210 by a complicated release mechanism and reeled in separately. Either way, the ballast weight 230 adds unnecessary labor to the user that is eliminated in the fishing diver 100.

It should now be understood that the deep sea diver according to the present invention establishes a center of gravity and center of effort that are coincident and such that a composite force F1 acting on the center of effort is collinear with a tension force F2 acting between a fishing line and balance bar at the ready configuration. As shown in FIGS. 5a and 5b, these relationships are maintained regardless of the diver's orientation in the water or how the current forces address the device. Accordingly, the deep sea diver can automatically descend toward an ocean bottom without the use of weights and can maintain its position without trolling, avoids erroneous tripping, and is automatically urged upward through the water after being tripped by a fish.

It is understood that while certain forms of this invention have been illustrated and described, it is not limited thereto except insofar as such limitations are included in the following claims and allowable functional equivalents thereof.

What is claimed is as follows:

1. A fishing diver, comprising:
    a body having front and rear ends, opposed sides, and opposed top and bottom surfaces, said body defining a center of gravity and a center of effort, said center of gravity and center of effort being coincident;
    a balance bar extending upwardly from said top surface, said balance bar having forward and rearward portions extending upwardly generally perpendicular to said top surface and a connecting portion connecting a top end of said forward portion to a top end of said rearward portion, said rearward portion being longer than said forward portion;
    means for operatively attaching a hook to said body, said means including a hole in said body between said balance bar rearward portion and said rear end;
    wherein said body further defines a void therein adjacent said rear end, said void extending in a plane which is perpendicular to said forward and rearward portions of said balance bar;
    wherein said body is not coupled to a ballast weight;
    wherein a fishing line, when operatively coupled to said balance bar, is adjustable between a ready configuration in which said fishing line is adjacent an intersection of said rearward and connecting portions of said balance bar and a tripped configuration in which said fishing line is adjacent said balance bar forward portion;
    wherein a composite force acting upon said center of effort is collinear with a tension force between said fishing line and said balance bar when said fishing line is at said ready configuration; and
    wherein said composite force includes current and gravity forces.

2. The fishing diver of claim 1, wherein an imaginary axis extends from said front end to said rear end and separates symmetrical first and second halves of said body.

3. The fishing diver of claim 2, wherein:
    said forward and rearward portions of said balance bar are centered along said imaginary axis; and said hole in said body is centered along said imaginary axis.

4. The fishing diver of claim 3, wherein said opposed sides of said body extend away from said top surface of said body.

5. The fishing diver of claim 4, wherein said void is symmetrical about said imaginary axis.

6. The fishing diver of claim 4, wherein said void is centered along said imaginary axis.

7. The fishing diver of claim 1, wherein said rear end of said body is wider than said front end of said body.

8. A fishing diver for remaining near a sea floor without the use of ballast weights and without requiring movement of the user, the fishing diver comprising:
- a body being symmetrical about an imaginary axis, said body having opposed top and bottom surfaces and front and rear ends, said body defining a center of gravity and a center of effort, said center of gravity and said center of effort being coincident;
- a hole in said body adjacent said rear end, said hole being centered along said imaginary axis;
- a balance bar centered along said imaginary axis and extending upwardly from said top surface, said balance bar having forward and rearward portions extending generally perpendicular to said top surface and a connecting portion connecting a top end of said forward portion to a top end of said rearward portion, said rearward portion being longer than said forward portion;
- wherein said body further defines a void therein adjacent said rear end, said void extending in a plane which is perpendicular to said forward and rearward portions of said balance bar;
- wherein a fishing line, when operatively coupled to said balance bar, is adjustable between a ready configuration in which said fishing line is adjacent to an intersection of said rearward and connection portions of said balance bar and a tripped configuration in which said fishing line is adjacent said balance bar forward portion;
- wherein a composite force acting upon said center of effort is collinear with a tension force between said fishing line and said balance bar when said fishing line is at said ready configuration; and
- wherein said composite force includes current and gravity forces.

9. The fishing diver of claim 8, wherein said void is symmetrical about and centered along said imaginary axis.

10. The fishing diver of claim 8, wherein said body includes sides extending away from said top surface of said body.

11. A fishing diver for use with a fishing line and that is capable of remaining near a sea floor without the use of ballast weights and without requiring movement of the user, the fishing diver comprising:
- a body being symmetrical about an imaginary axis, said body having opposed top and bottom surfaces and front and rear ends, said body defining a center of gravity and a center of effort that is coincident with said center of gravity;
- a hole in said body adjacent said rear end, said hole being centered along said imaginary axis; and
- a balance bar centered along said imaginary axis and extending upwardly from said top surface, said balance bar having forward and rearward portions extending generally perpendicular to said top surface and a connecting portion connecting a top end of said forward portion to a top end of said rearward portion, said rearward portion being longer than said forward portion;
- wherein said body defines a void therein adjacent said rear end, said void extend in a plane which is perpendicular to said forward and rearward portions of said balance bar, said void being symmetrical about and centered along said imaginary axis;
- wherein a fishing line, when operatively coupled to said balance bar, is adjustable between a ready configuration in which said fishing line is adjacent an intersection of said rearward and connecting portions of said balance bar and a tripped configuration in which said fishing line is adjacent said balance bar forward portion; and
- wherein a composite force acting upon said center of effort is collinear with a tension force between said fishing line and said balance bar when said fishing line is at said ready configuration.

* * * * *